United States Patent [19]

Hartley

[11] 3,894,449

[45] July 15, 1975

[54] REPAIR OF TUBELESS PNEUMATIC TIRES

[75] Inventor: Charles N. Hartley, Sutton Coldfield, England

[73] Assignee: The Dunlop Company Limited, England

[22] Filed: May 20, 1974

[21] Appl. No.: 471,721

Related U.S. Application Data

[62] Division of Ser. No. 12,020, Feb. 17, 1970, abandoned.

[30] Foreign Application Priority Data

Feb. 26, 1969 United Kingdom.................... 10312

[52] U.S. Cl. ............................................... 81/15.7
[51] Int. Cl. .......................................... B60c 25/16
[58] Field of Search ............ 81/15.7, 15.5; 152/368

[56] References Cited

UNITED STATES PATENTS

| 389,235 | 9/1888 | McBrayer | 81/15.7 |
| 596,165 | 12/1897 | Jencks | 81/15.7 |
| 2,271,339 | 1/1942 | Hawkinson | 81/15.7 X |
| 2,866,494 | 12/1958 | Sanderson | 81/15.7 UX |

Primary Examiner—Al Lawrence Smith
Assistant Examiner—Roscoe V. Parker
Attorney, Agent, or Firm—Stevens, Davis, Miller and Mosher

[57] ABSTRACT

A tool for repairing a puncture in the tread of a tubeless tire having a curved elongated shank, the tool being held in abutment against a tire bead while a plug is engaged on the tool for drawing the plug through said puncture.

6 Claims, 1 Drawing Figure

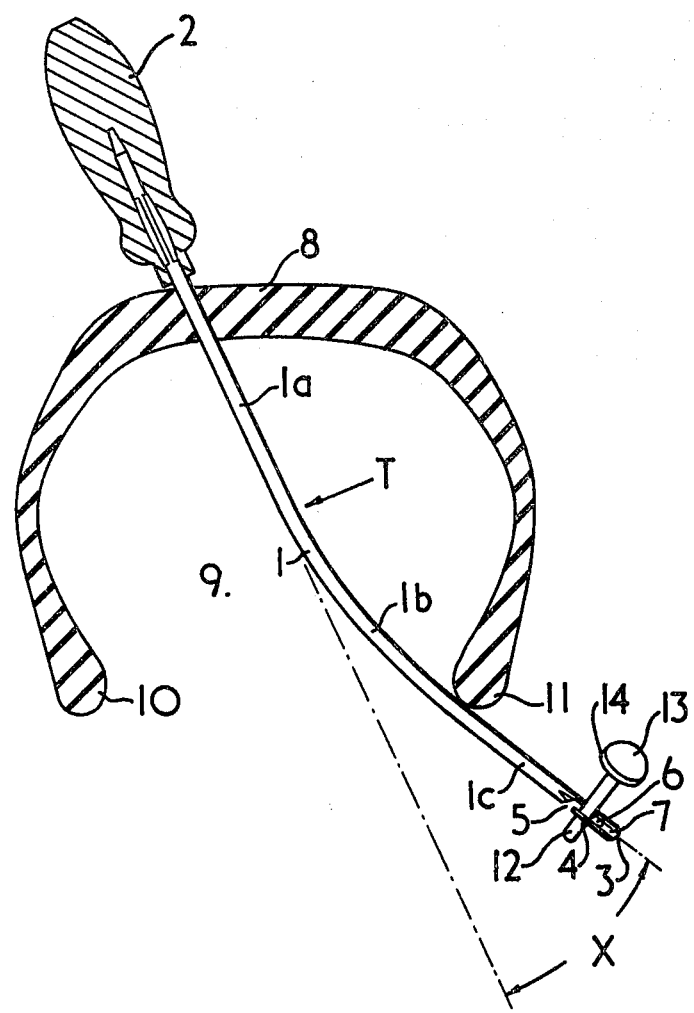

REPAIR OF TUBELESS PNEUMATIC TIRES

This is a division of application Ser. No. 12,020, filed Feb. 17, 1970, and now abandoned.

This invention relates to the repair of tubeless pneumatic tire.

It is an object of the present invention to provide a method of permanently repairing a tread puncture in a tubeless pneumatic tire and it is a further object to provide a repair tool appropriate for this purpose.

According to this invention there is provided a method of repairing a tread puncture in a tubeless tire comprising inserting a curved shank elongated tool with a hook at one extremity through the puncture to project beyond the space formed between tire beads, securing to the hook a repair plug and integral patch wetted with a liquid material capable of assisting adhesion of the plug and integral patch in the tread puncture while the curved shank is in supporting abutment against one of the beads and drawing the tool back through the puncture together with the plug so that the plug is secured within the puncture and the patch is located against the innternal surface of the tire surrounding the puncture.

The plug is wetted with a liquid material so as to make the insertion of the plug into the puncture easier, the material acting as a lubricant. The material may comprise an adhesive, e.g., a rubber solution, and/or an accelerator, e.g., a mixture of dithiocarbamates sold under the trade name Ancazate Q. In the preferred instance, where the material includes an accelerator, the plug comprises a vulcanized rubber compound containing an excess of vulcanizing agent, e.g., sulphur, and the patch has adhered to it, on the side from which the plug protrudes, a layer of uncured rubber compound not containing an accelerator or vulcanizing agent. When the internal plug and patch is in position, migration of the vulcanizing agent takes place into the uncured layer and, in the presence of the accelerator, a cold-cure occurs after a time to form a permanent repair.

The invention also includes a tool according to the preceding paragraph, i.e., comprising a curved elongated shank having a hook and terminal tapered point at or adjacent to one end and a handle at the other. In one form of tool the shank is curved intermediate its ends and has a straight portion at each end. Preferably at least one groove is provided adjacent to the hook to retain adhesive, accelerator or other liquid material for a purpose to be described.

One embodiment of the invention will now be described by way of example with reference to the accompanying drawing showing a cross-section through the tool in position in a tire, a plus and integral patch being engaged on the tool.

A motor car tire, having a tread puncture caused by the penetration of a nail is demounted from the rim and the nail removed.

The repair is effected by means of a mushroom-shaped rubber plug and integral patch of known type, the stem forming the plug which is secured under compression in the punctured body of the rubber tread and the mushroom head forming the patch around the puncture internally of the tire against the inner liner, the layer of initially uncured compound being sandwiched between the patch (or head) and the inner liner as will be appreciated from the description which follows.

A repair tool T is provided comprising a shank 1 which is firmly secured in a handle 2 the shank comprising a first straight portion 1a immediately adjacent the handle. a curved portion 1b about half-way intermediate the ends of the shank and a second straight portion 1c being inclined at an angle of about 27° (indicated as X in the drawing) to the first straight portin 1a. At the end remote from the handle, the tool is provided with a rounded point 3 adjacent to which is formed a C-shaped hook 4, the hook having a side opening 5 at the end of the C shape nearest the handle and a semi-closed plug-retaining portion 6 at the end nearest the rounded point. Opposite sides of the tool, adjacent to the rounded point and at each end of the hook, are each provided with a longitudinally-extending groove 7 for retaining rubber solution or, in this case, accelerator.

In the repair of the punctured tread the tool is dipped into the accelerator so that the shank is coated with it and the grooves are substantially filled, the tool then being inserted into the punctured tire tread 8 so that the injured portion is internally coated with the accelerator, the tool being forced through the puncture so that the hooked end extends through the interior chamber 9 of the tire and beyond the beads (10 and 11).

A mushroom-shaped integral repair plug 12 and patch 13 is engaged, by means of the end of the plug portion remote from the head, with the C-shaped hook on the tool end. The diameter of the plug 12 is considerably greater than the internal dimensions of the hook and it is necessary to stretch the end of the plug to reduce its diameter and facilitate engagement of the plug with the hook and, as considerable force is necessary, this operation is greatly facilitated by the fact that the curved end of the tool is inclined, by the curvature of the shank 1, towards one or other of the bead portions which, being inherently stiff, form a secure abutment against which the force necessary for engagement of plug with hook can be applied. (In the diagram the shank 1 is shown in abutment with bead 11).

The whole of the plug and that surface of the layer 14 of uncurred rubber compound adhered to the patch for engagement with the inner liner is coated with the accelerator as also is the corresponding surface of the inner liner. The tool T is then operated to draw the plug and integral patch up against the puncture, the plug being drawn through the puncture to apply the patch firmly against the inner liner to be pressed in engagement therewith by the operator and cold curing of the initially uncured layer subsequently allowed to occur in position. The plug is retained within the puncture under substantially radial compression.

The repair is completed by trimming that end of the plug which extends beyond the puncture externally of the tire tread flush with the tread.

A permanent repair is thus effected by a convenient and rapid method according to the present invention.

In the embodiment described the tool is provided with a shank which is bent through an angle of about 27° but it will be appreciated that other angles may be chosen appropriate to the duty to be performed, an angle in the range of 27°± 6° having been found to be of universal value in repairing tires of a variety of sectional depths. The length of the shank is made such that when the handle is fully home against the external surface of the tread the hooked end will project clear of the beads in the deepest section of tire in which it is intended that the tool should be used for puncture repair.

What is claimed is:

1. A repair tool for a pneumatic tire comprising a curved elongated shank having a hook and terminal rounded point at or adjacent to one end and a handle at the other end, the end of the shank formed with the hook and terminal rounded point being inclined at an angle of 27° to the end of the shank provided with the handle.

2. A repair tool for a pneumatic tire comprising a curved elongated shank having a hook and terminal rounded point at or adjacent to one end and a handle at the other end, the end of the shank formed with the hook end terminal rounded point being inclined at an angle in the range 27° ± 6° to the end of the shank provided with the handle.

3. A repair tool according to claim 1 comprising at least one longitudinally extending groove provided adjacent to the hook.

4. A repair tool according to claim 2 comprising at least one longitudinally extending groove provded adjacent to the hook.

5. A tire repair tool according to claim 1 wherein the ends of the shank are inclined one to another by said shank having a curved portion intermediate the ends thereof and a straight portion adjacent each end thereof.

6. A tire repair tool according to claim 2 wherein the ends of the shank are inclined one to another by said shank having a curved portion intermediate the ends thereof and a straight portion adjacent each end thereof.

* * * * *